United States Patent
Hederstad et al.

(10) Patent No.: US 9,512,900 B2
(45) Date of Patent: Dec. 6, 2016

(54) PLANETARY GEAR MECHANISM WITH REDUCED GEAR LASH

(71) Applicant: e-AAM Driveline Systems AB, Trollhättan (SE)

(72) Inventors: Magnus Hederstad, Trollhättan (SE); Erik J. Sten, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 45 days.

(21) Appl. No.: 14/707,088

(22) Filed: May 8, 2015

(65) Prior Publication Data

US 2016/0327123 A1 Nov. 10, 2016

(51) Int. Cl.
*F16H 1/28* (2006.01)

(52) U.S. Cl.
CPC .......... *F16H 1/2863* (2013.01); *F16H 1/2836* (2013.01)

(58) Field of Classification Search
CPC .............................. F16H 1/2863; F16H 1/2836
See application file for complete search history.

(56) References Cited

U.S. PATENT DOCUMENTS

| | | | | |
|---|---|---|---|---|
| 1,968,604 A | * | 7/1934 | Hertz | F16H 1/28 475/338 |
| 2,231,784 A | * | 2/1941 | Von Thungen | F16H 1/2836 123/70 V |
| 3,943,780 A | * | 3/1976 | Klaue | F16H 1/2836 475/219 |
| 4,524,643 A | * | 6/1985 | Ziegler | F16H 1/2836 475/345 |
| 4,771,654 A | * | 9/1988 | Shinjo | F16H 1/2836 475/31 |

(Continued)

FOREIGN PATENT DOCUMENTS

| | | | |
|---|---|---|---|
| DE | 102012211286 | * | 7/2014 |
| EP | 0188616 A1 | | 7/1986 |

(Continued)

OTHER PUBLICATIONS

PCT International Search Report Mailed Jul. 21, 2016 for corresponding PCT Application No. PCT/IB2016/052584, filed May 5, 2016.

(Continued)

*Primary Examiner* — Sherry Estremsky
(74) *Attorney, Agent, or Firm* — Harness, Dickey & Pierce, P.L.C.

(57) ABSTRACT

The present teachings provide for a transmission including a planetary gear set and a first displacement device. The planetary gear set can include a sun gear, ring gear, planet carrier, first planet gear and second planet gear. The sun gear, ring gear, and planet carrier can be disposed about a first axis. The first planet gear can meshingly engage with the sun gear and the ring gear, and can be coupled to the planet carrier for rotation relative thereto about a second axis. The first planet gear can be axially slidable relative to the planet carrier. The second planet gear can meshingly engage with the sun gear and the ring gear, and can be coupled to the planet carrier for rotation relative thereto about a third axis. The first displacement device can be configured to displace the first planet gear axially relative to the second planet gear.

20 Claims, 7 Drawing Sheets

(56) References Cited

U.S. PATENT DOCUMENTS

| | | | |
|---|---|---|---|
| 5,588,328 A | 12/1996 | Nihei et al. | |
| 5,680,836 A * | 10/1997 | Pierik | F01L 1/352 |
| | | | 123/90.17 |
| 7,568,993 B2 * | 8/2009 | Schulz | F16H 1/2854 |
| | | | 475/336 |
| 8,663,051 B2 | 3/2014 | Sten | |
| 8,893,572 B2 | 11/2014 | Wu et al. | |
| 8,998,765 B2 | 4/2015 | Sten | |
| 2003/0073537 A1 * | 4/2003 | Lloyd | F16H 1/2863 |
| | | | 475/331 |
| 2004/0089089 A1 | 5/2004 | Stevens et al. | |
| 2013/0145875 A1 | 6/2013 | Wu et al. | |
| 2013/0150205 A1 | 6/2013 | Wu et al. | |
| 2013/0199323 A1 | 8/2013 | Fong et al. | |
| 2014/0364264 A1 | 12/2014 | Sten | |
| 2016/0208684 A1 * | 7/2016 | Naruoka | F02B 39/04 |

FOREIGN PATENT DOCUMENTS

| | | |
|---|---|---|
| JP | 04277353 B2 | 6/2009 |
| SU | 1305482 A1 | 4/1987 |

OTHER PUBLICATIONS

PCT Written Opinion for corresponding PCT Application No. PCT/IB2016/052584, filed May 5, 2016.

\* cited by examiner

PLANETARY GEAR MECHANISM WITH REDUCED GEAR LASH

FIELD

The present disclosure relates to a planetary gear mechanism with reduced gear lash.

BACKGROUND

This section provides background information related to the present disclosure which is not necessarily prior art.

Transmissions that have planetary gear sets typically include a sun gear, a ring gear, a planet carrier, and a plurality of planet gears. The planet gears are mounted to the planet carrier for common rotation about a central axis of the sun and ring gears, while being rotatable relative to the planet carrier. The planet gears are meshingly engaged with both the ring gear and the sun gear. One of the sun gear, ring gear, or planet carrier is typically non-rotatably coupled to a housing of the transmission and the other two of sun gear, ring gear, or planet carrier receive and/or transmit torque between input and output members of the transmission.

The geometry of the gear teeth, tolerances, and/or wear of the gear teeth can result in backlash or play between the sun gear, ring gear, and planet gears. Backlash between the gears of the planetary gear set can result in undesirable noise, vibration, and/or harshness ("NVH") during load cycling of the transmission or when reversing the rotational direction of the input member, as the backlash must be taken up before torque can be transferred between the gears of the planetary gear set.

In vehicles which employ an electric motor for propulsive power or for torque vectoring, the electric motor typically is drivingly coupled to a transmission including a planetary gear set to provide torque thereto on an as-needed basis. The electric motor can be operated in an intermittent fashion and can frequently change rotational direction (e.g. based on tractive need and/or whether the vehicle is making a right or left turn), which can result in undesirable NVH due to backlash in the planetary gear set.

Furthermore, planetary gear sets can suffer from torque sharing, or unequal loading of the planet gears, especially when the planetary gear set includes four or more planet gears. Typically, such unequal load sharing is addressed by increasing the size of the planet gears, which can result in undesirable increases in size, weight, and cost of the transmission.

SUMMARY

This section provides a general summary of the disclosure, and is not a comprehensive disclosure of its full scope or all of its features.

The present teachings provide for a transmission including a planetary gear set and a first displacement device. The planetary gear set can include a sun gear, a ring gear, a planet carrier, a first planet gear and a second planet gear. The sun gear can be disposed about a first axis. The ring gear can be disposed about the first axis. The planet carrier can be disposed about the first axis. The first planet gear can be meshingly engaged with the sun gear and the ring gear, and can be coupled to the planet carrier for rotation relative to the planet carrier about a second axis. The first planet gear can be axially slidable relative to the planet carrier. The second planet gear can be meshingly engaged with the sun gear and the ring gear, and can be coupled to the planet carrier for rotation relative to the planet carrier about a third axis. The first displacement device can be configured to displace the first planet gear axially relative to the second planet gear.

The present teaching further provide for a transmission including a housing, a planetary gear set and a first displacement device. The planetary gear set can be disposed about a first axis and can include a sun gear, a ring gear, a planet carrier, a first planet gear and a second planet gear. The sun gear can be rotatable about the first axis. The ring gear can be non-rotatably coupled to the housing. The planet carrier can be rotatable about the first axis. The first planet gear can be meshingly engaged with the sun gear and the ring gear and can be coupled to the planet carrier for common rotation about the first axis. The first planet gear can be rotatable relative to the planet carrier about a second axis and can be axially slidable along the second axis relative to the planet carrier. The second planet gear can be meshingly engaged with the sun gear and the ring gear, and can be coupled to the planet carrier for common rotation about the first axis. The second planet gear can be rotatable relative to the planet carrier about a third axis. The first displacement device can be configured to displace the first planet gear axially relative to the second planet gear.

The present teaching further provide for a transmission including a planetary gear set and a first biasing device. The planetary gear set can be disposed about a first axis and can include a sun gear, a ring gear, a planet carrier, a plurality of first planet gears, and a plurality of second planet gears. The sun gear can rotate about the first axis. The ring gear can be non-rotatably coupled to the housing. The planet carrier can be rotatable about the first axis. The plurality of first planet gears can be meshingly engaged with the sun gear and the ring gear and coupled to the planet carrier for common rotation about the first axis. Each of the first planet gears can be rotatable relative to the planet carrier and can be axially slidable relative to the planet carrier. The plurality of second planet gears can be meshingly engaged with the sun gear and the ring gear, and can be coupled to the planet carrier for common rotation about the first axis. Each of the second planet gears can be rotatable relative to the planet carrier. The first and second planet gears can be equally spaced circumferentially about the first axis. The first biasing device can be configured to bias the first planet gears in a first axial direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
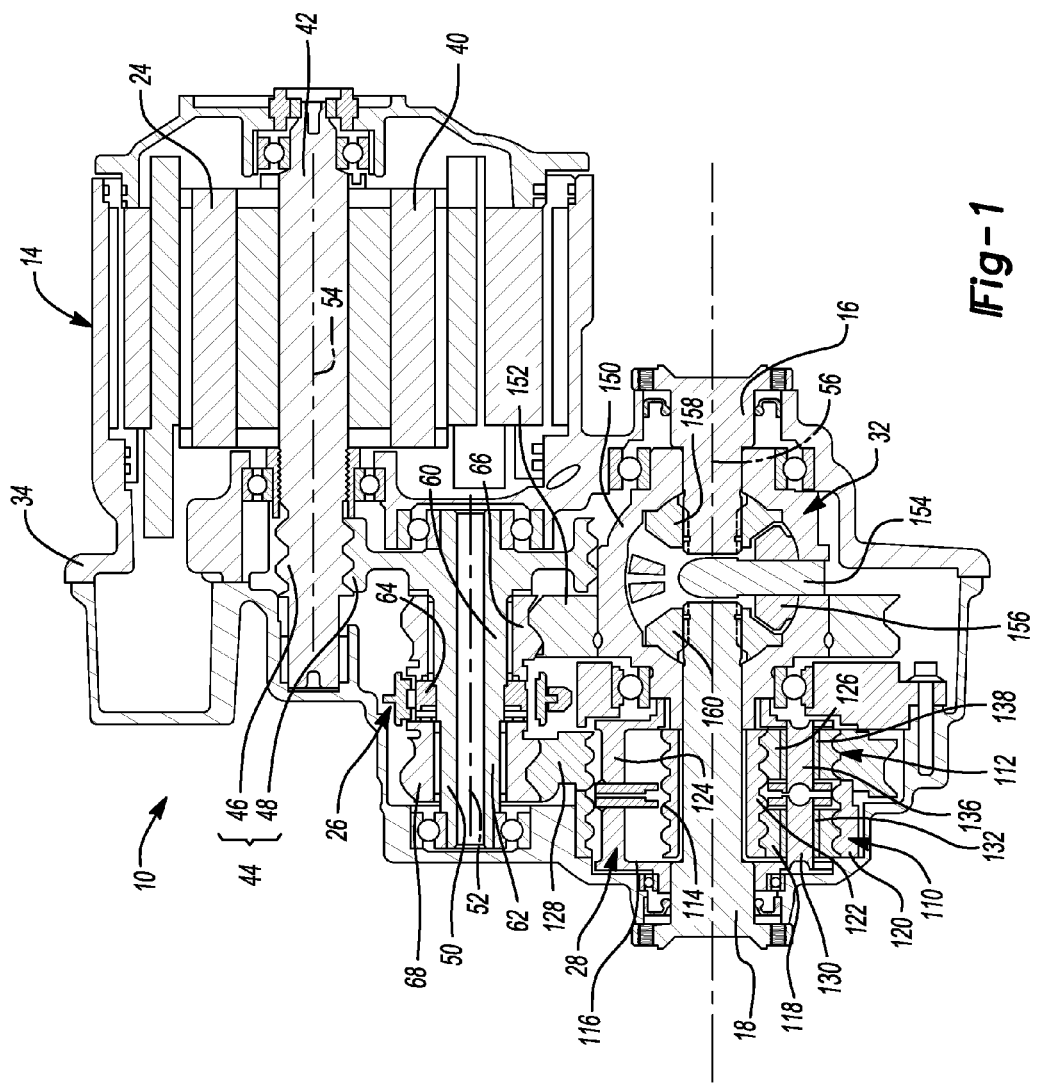
FIG. 1 is a sectional view of an example of a drive module including a planetary gear set constructed in accordance with the present disclosure.

In FIG. 1 of the drawings, a portion of an example of an electronic drive module ("eDM") 10 constructed in accordance with the teachings of the present disclosure is illustrated. Except as shown and otherwise described herein, the eDM 10 can be generally similar to any of the drive modules which are disclosed in commonly assigned, U.S. Pat. No. 8,998,765 the disclosure of which is incorporated by reference as if fully set forth in detail herein.

Briefly, the eDM 10 can include a torque distribution drive mechanism 14 that can be employed to transmit torque to first and second output members 16, 18. Each output member 16, 18 can be drivingly coupled to a wheel (not shown) of a vehicle (not shown). The torque distribution drive mechanism 14 can comprise a drive mechanism 24, a power transmitting component or clutch mechanism 26, a dual planetary gear set 28, a differential assembly 32 and a housing 34 into which the drive mechanism 24, the clutch mechanism 26, the dual planetary gear set 28 and the differential assembly 32 can be housed.

The drive mechanism 24 can comprise any type of motor, such as an electric motor 40, and can have a motor shaft 42 that can be selectively driven to provide rotary power to a reduction drive 44. The reduction drive 44 can include a first pinion gear 46, which can be mounted to the motor shaft 42 for rotation therewith, and a second pinion gear 48 that can be meshingly engaged to the first pinion gear 46 and mounted to an intermediate shaft 50 for common rotation. The intermediate shaft 50 can be disposed along an intermediate axis 52 that is generally parallel to a motor axis 54 about which the motor shaft 42 of the motor 40 rotates. The intermediate axis 52 can be parallel to an output axis 56 about which the differential assembly 32 and the first and second output members 16 and 18 can rotate though other configurations can be used.

The intermediate shaft 50 can have a first journal portion 60, a second journal portion 62 and a drive portion 64 that can be disposed between the first and second journal portions 60 and 62. The drive portion 64 can have a plurality of external splines or teeth (not specifically shown). A first intermediate output gear 66 can be rotatably received on the first journal portion 60 and a second intermediate output gear 68 can be rotatably received on the second journal portion 62. Bearings (not specifically shown) can be received between the first and second journal portions 60 and 62 and the first and second intermediate output gears 64 and 66, respectively. Thrust bearings (not specifically shown) can be disposed along the length of the intermediate shaft 50 at various locations to help promote relative rotation between the drive portion 64 and the first and second intermediate output gears 66 and 68.

The clutch mechanism 26 can be employed to selectively couple the first intermediate output gear 66 or the second intermediate output gear 68 to the intermediate shaft 50.

The dual planetary gear set 28 can include a first planetary gear set 110 and a second planetary gear set 112. The first planetary gear set 110 can include a first sun gear 114, a first planet carrier 116, a plurality of first planet gears 118 and a first ring gear 120, while the second planetary gear set 112 can include a second sun gear 122, a second planet carrier 124, a plurality of second planet gears 126 and a second ring gear 128. The first sun gear 114 can be a hollow structure through which the second output member 18 can be received. The first planet carrier 116 can be rotatable relative to the housing 34 and can be coupled to the second output member 18 for common rotation. The first planet carrier 116 can have a plurality of first pins 130 that can support the first planet gears 118. The first planet gears 118 can be supported about the first pins 130 by a plurality of bearings or journals 132. The first planet gears 118 can be meshingly engaged to the first sun gear 114 and the first ring gear 120. The first ring gear 120 can be non-rotatably coupled to the housing 34.

The second sun gear 122 can be coupled to the first sun gear 114 for common rotation and can be a hollow structure through which the second output member 18 can be received. The second planet carrier 124 can be rotatable relative to the housing 34 and can have a plurality of second pins 136 that can support the second planet gears 126. The second planet gears 126 can be supported about the second pins 136 by a plurality of bearings or journals 138. The second planet gears 126 can be meshingly engaged to the second sun gear 122 and the second ring gear 128. The second ring gear 128 can have a set of external teeth that can be meshingly engaged to the second intermediate output gear 68.

The differential assembly 32 can include a differential case 150, a ring gear 152, a cross-pin 154, a plurality of differential pinions 156, and first and second side gears 158 and 160. The differential case 150 can be coupled to the second planet carrier 124 for common rotation. The ring gear 152 can be mounted to the differential case 150 for common rotation and can be meshingly engaged to the first intermediate output gear 66. The cross-pin 154 can be mounted to the differential case 150 perpendicular to the output axis 56. The differential pinions 156 can be journally supported by the cross-pin 154 and meshingly engaged to the first and second side gears 158 and 160. The first output member 16 can be coupled to the first side gear 100 for rotation therewith, and the second output member 18 can be coupled to the second side gear 102 for rotation therewith.

Operation of the clutch mechanism 26 in a first mode (i.e., a propulsion mode) can couple the first intermediate output gear 66 to the intermediate shaft 50 to thereby drive the ring gear 152 of the differential assembly 32. Rotation of the ring gear 152 drives the differential case 150 and the cross-pin 154 for rotation about the output axis 56, driving the differential pinions 156 to cause corresponding rotation of the first and second side gears 158 and 160. In this mode, the dual planetary gear set 28 does not affect operation of the differential assembly 32 and, as such, the differential assembly 32 provides rotary power to the first and second output members 16 and 18 in the manner of a standard open differential assembly.

Operation of the clutch mechanism 26 in a second mode (i.e., a torque vectoring mode) can couple the second intermediate output gear 68 to the intermediate shaft 50 to thereby drive the second ring gear 128 of the dual planetary gear set 28. In this embodiment, rotary power is output from the second planetary gear set 112 to the differential case 150 (via the second planet carrier 124) and rotary power is output from the first planetary gear set 110 to the second output member 18 (via the first planet carrier 116). As the second output member 18 is non-rotatably coupled to the second side gear 160, it will be appreciated that the first planet carrier 116 is also drivingly coupled to the second side gear 160. Those of skill in the art will appreciate from this disclosure that the dual planetary gear set 28 can be employed to impose equal but opposite moments on the first and second output members 16 and 18 and that the direction of the rotary power (torque) that is applied to a given one of the output members 16, 18 is dependent upon the direction in which the motor 40 is operated.

Figure 2:
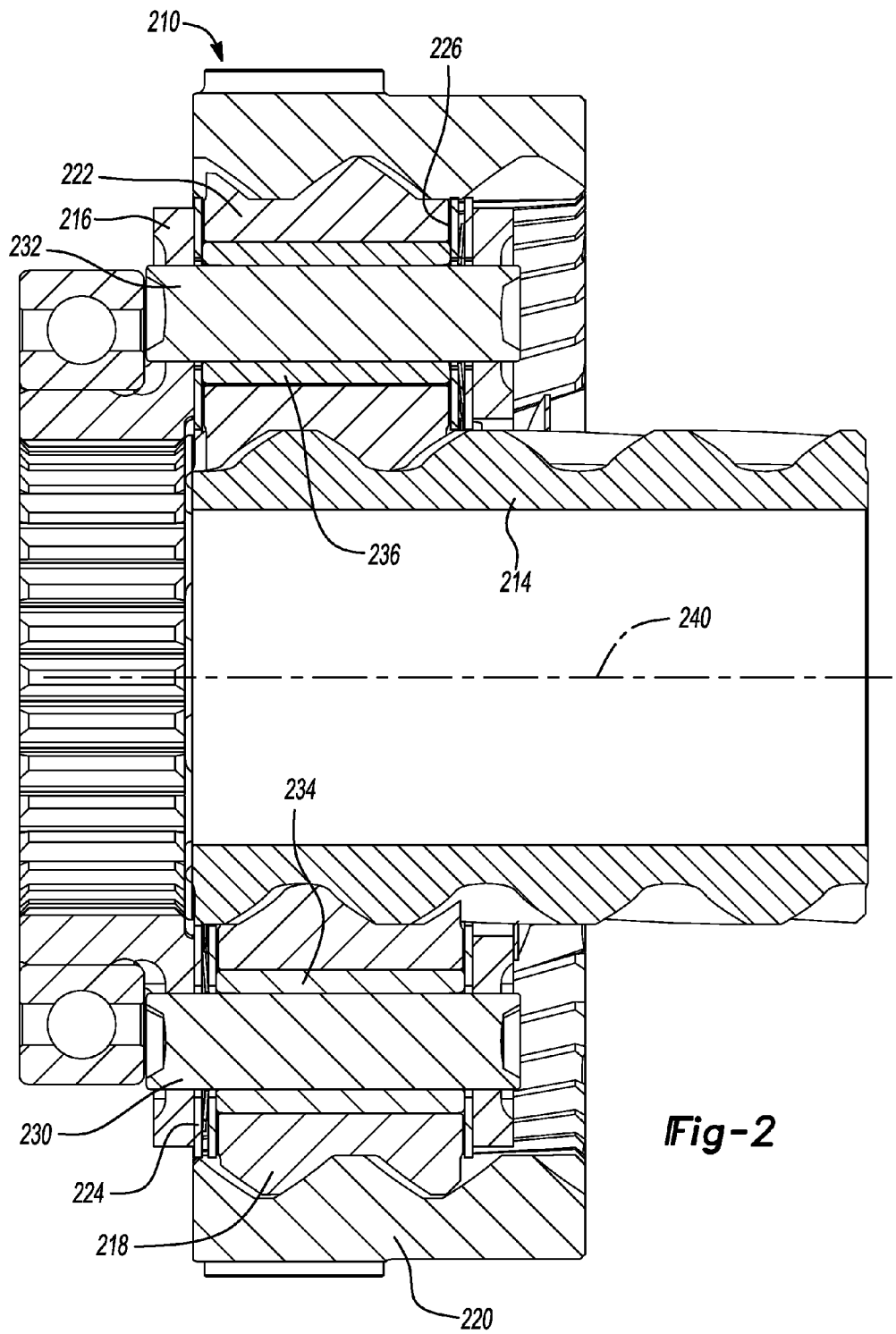
FIG. 2 is a sectional view of a planetary gear set similar to the planetary gear set of FIG. 1.
Figure 3:
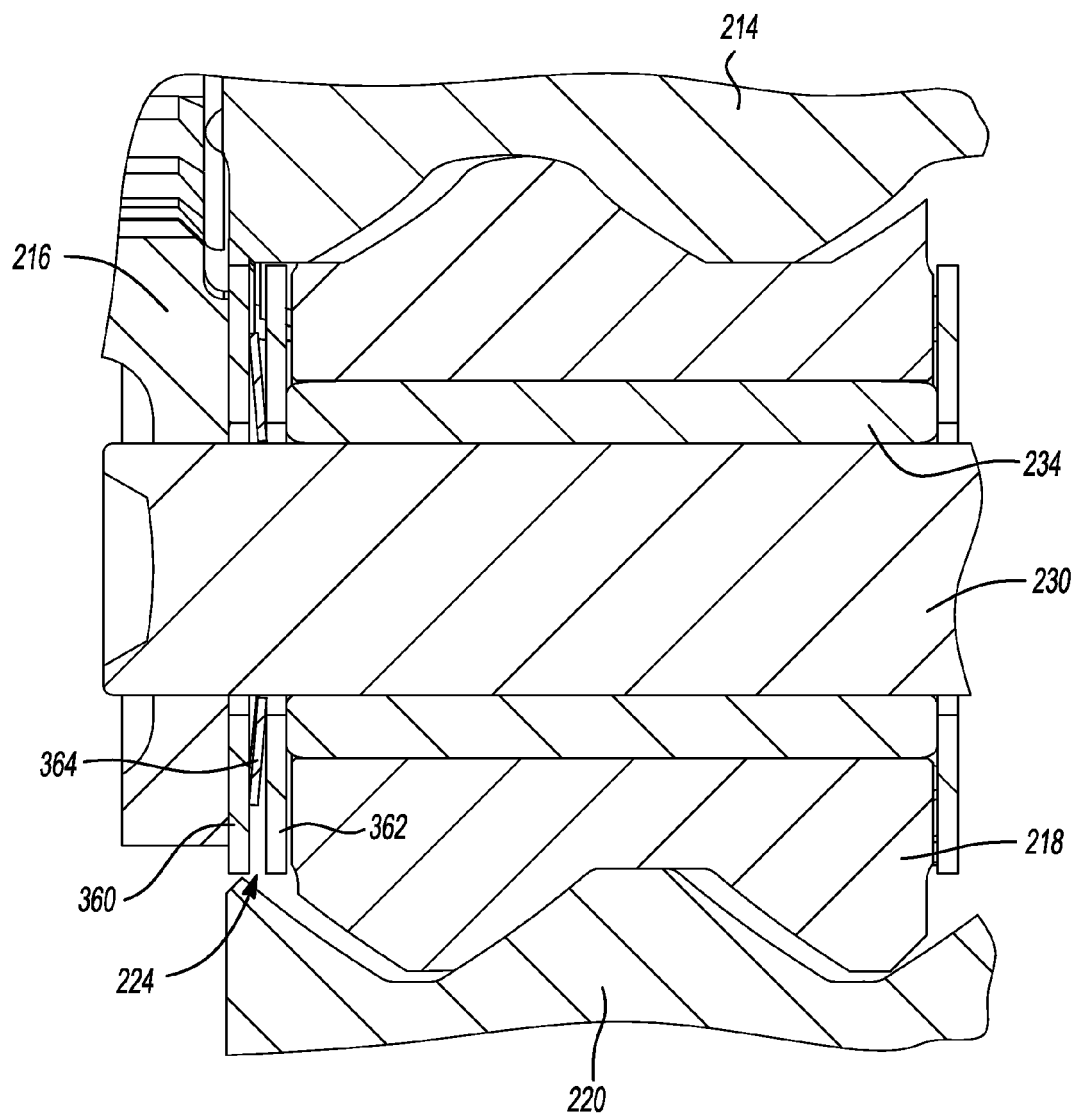
FIG. 3 is a sectional view of a portion of the planetary gear set of FIG. 1, illustrating a displacement device of a first construction.
Figure 4:
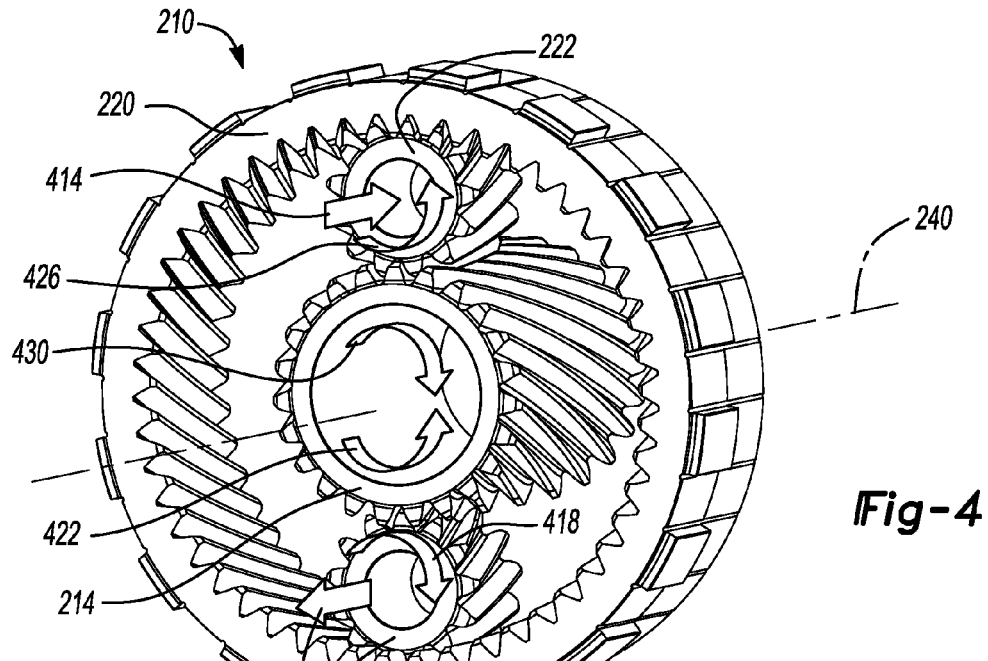
FIG. 4 is a perspective view of a portion of the planetary gear set of FIG. 1, illustrating a sun gear, a ring gear, and a plurality of planetary gears.

With reference to FIGS. 2-4, a planetary gear set 210 is illustrated. The planetary gear set 210 can be similar to the first or second planetary gear sets 110, 112 (FIG. 1) and can be used with an eDM such as eDM 10 (FIG. 1) in place of the first and/or second planetary gear sets 110, 112 (FIG. 1). It is appreciated that the planetary gear set 210 can be used with any suitable drive mechanism or transmission having a planetary gear set. The planetary gear set 210 can include a sun gear 214, a planet carrier 216, at least one first planet gear 218, a ring gear 220, at least one second planet gear 222 and a first displacement device 224. The planetary gear set 210 can also include a second displacement device 226.

The sun gear 214 can be similar to the first or second sun gear 114, 122 (FIG. 1) and can be a hollow structure through which an output member (e.g. the second output member 18 of the eDM 10 of FIG. 1) can be received. The planet carrier 216 can be rotatable relative to a housing (not specifically shown; e.g. housing 34 of FIG. 1) that houses the planetary gear set 210, and can be coupled to an output member (e.g. second output member 18 or differential carrier 150 of FIG. 1) for common rotation. The planet carrier 216 can have at least one first pin 230 and at least one second pin 232.

Each first pin 230 can support one of the first planet gears 218 for rotation relative to the planet carrier 216 and each second pin 232 can support one of the second planet gears 222 for rotation relative to the planet carrier 216. Each of the first planet gears 218 can be supported about the corresponding one of the first pins 230 by a first bearing or journal 234. Each of the second planet gears 222 can be supported about the corresponding one of the second pins 232 by a second bearing or journal 236. The first planet gears 218 can be meshingly engaged to the sun gear 214 and the ring gear 220. The second planet gears 222 can be meshingly engaged to the sun gear 214 and the ring gear 220. The first and second planet gears 218, 222 can be disposed on diametrically opposite sides of a center axis 240 of the planet carrier 216. As best shown in FIG. 4, the first and second planet gears 218, 222, the sun gear 214, and the ring gear 220 can be helical gears having helical gear teeth.

The ring gear 220 can be non-rotatably coupled to the housing (e.g. similar to the first ring gear 120 and housing 34 of FIG. 1) that houses the planetary gear set 210. Alternatively, the ring gear 220 can be rotatable relative to the housing (e.g. similar to the second ring gear 128 of FIG. 1) and can have a plurality of external teeth (not specifically shown) that can be meshingly engaged to an output gear (not specifically shown; e.g. similar to the second ring gear 128 and intermediate output gear 68 of FIG. 1).

Tolerances and gear teeth profiles can result in spacing or backlash between the teeth of the first and second planet gears 218, 222 and the teeth of the sun and ring gears 214, 220. In the example provided, the journals 234, 236 can support the first and second planet gears 218, 222 such that the first and second planet gears 218, 222 can be axially slidable relative to the first and second pins 230, 232. The first displacement device 224 can be configured to displace the first planet gear 218 axially relative to the second planet gear 222 and into meshing contact with the teeth of the sun gear 214 to reduce this backlash. In the example provided, the second displacement device 226 is included and can displace the second planet gear 222 relative to the first planet gear 218 and into meshing contact with the teeth of the sun gear 214 to reduce this backlash. In the example provided, the first and second displacement devices 224, 226 displace the first and second planet gears 218, 222, respectively, in opposite axial directions 410 and 414, as shown in FIG. 4.

Due to the helical pattern of the gear teeth of the first planet gear 218 and the sun gear 214, the axial displacement of the first planet gear 218 in the axial direction 410 can impart a torque on the first planet gear 218 in a first rotational direction 418 and a torque on the sun gear 214 in a second rotational direction 422. Due to the helical pattern of the gear teeth of the second planet gear 222 and the sun gear 214, the axial displacement of the second planet gear 222 in the axial direction 414 can impart a torque on the second planet gear 222 in a third rotational direction 426 and a torque on the sun gear 214 in a fourth rotational direction 430. The torques in the second and fourth rotational directions 422, 430 can be opposite and equal as to cancel each other out. This biasing force and axial displacement can ensure constant contact of the gear teeth of the first and second planet gears 218, 222 with the sun gear 214 and the ring gear 220 to eliminate backlash.

In an alternative construction (not specifically shown), the second displacement device 236 is not included and the second planet gear 222 can be axially fixed relative to the planet carrier 216. The first displacement device 224 can displace the first planet gears 218 axially relative to the second planet gears 222 and into meshing contact with the teeth of the sun gear 214. In such a construction, the first displacement device 224 can be configured to displace the first planet gear 218 in either axial direction 410, 414.

In this construction, the torque in the first rotational direction 418 can cause the sun gear 214 to rotate slightly in the second rotational direction 422 until the teeth of the sun gear 214 and the teeth of the second planet gear 222 meshingly contact each other (e.g. the backlash between the second planet gear 222 and the sun gear 214 is taken up). Since the second planet gear 222 is axially fixed relative to the planet carrier 216, the helical pattern of the gear teeth can impart a torque on the sun gear 214 in the fourth rotational direction 430 equal to the torque in the second rotational direction 422. The torques in the second and fourth rotational directions 422, 430 can be opposite and equal as to cancel each other out.

With specific reference to FIG. 3, the first displacement device 224 is illustrated in greater detail. The second displacement device 226 can be constructed similarly to the first displacement device 224. For this reason, only the first displacement device 224 will be described in detail. The first displacement device 224 can include an outer washer 360, an inner washer 362, and a spring member 364. The outer and inner washers 360, 362 can be any suitable type of washer and can be disposed about the first pin 230, axially between the first planet gear 218 and the planet carrier 216. The outer and inner washers 360, 362 can be free to rotate relative to the first pin 230. The spring member 364 can be disposed about the first pin 230 and axially between the outer and inner washers 360, 362. The first spring member 364 can be configured to bias the inner washer 362 axially against the first planet gear 218 to axially displace the first planet gear 218 relative to the first pin 230 and the planet carrier 216. In the example provided, the spring member 364 is a Belleville washer, though other configurations can be used such as a coil spring for example.

Figure 5:
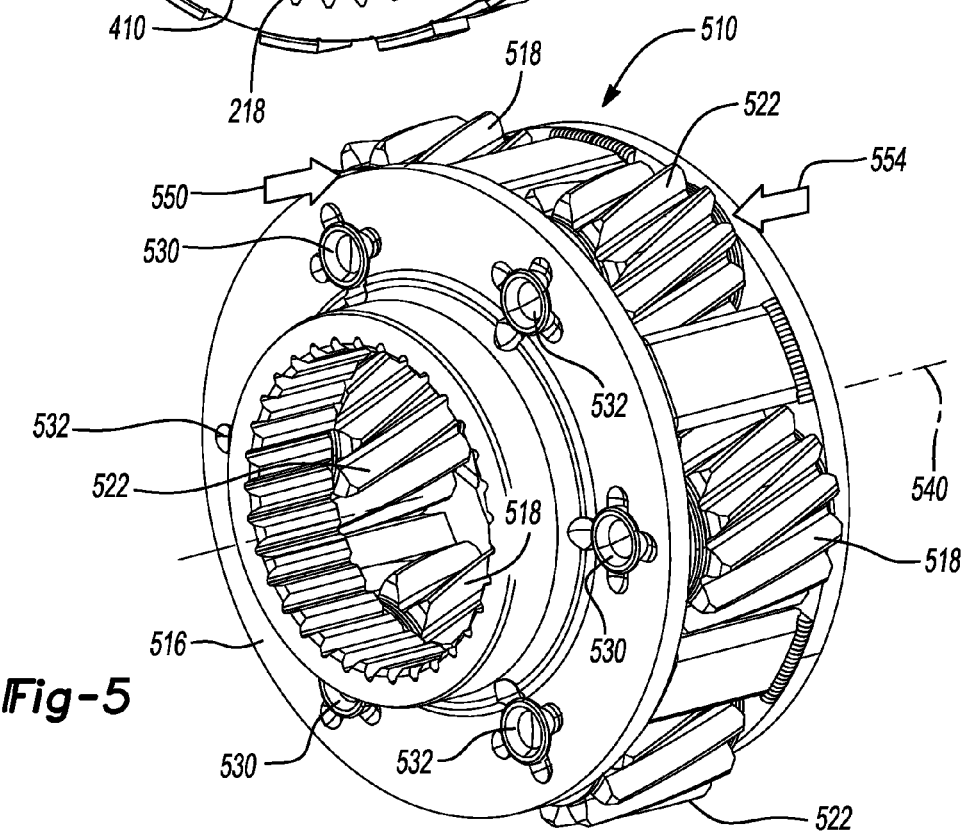
FIG. 5 is a perspective view of a portion of the planetary gear set of FIG. 1, illustrating a plurality of planet gears and a planet carrier.

While FIGS. 2-4 only show one first planet gear 218 and one second planet gear 222, the planetary gear set 210 can include a plurality of first and second planet gears 218, 222. For example, FIG. 5 illustrates a planetary gear set 510 that can be constructed similarly to planetary gear set 210. The planetary gear set 510 can include a sun gear (not shown), a planet carrier 516, a plurality of first planet gears 518, a ring gear (not shown), a plurality of second planet gears 522, and a plurality of first displacement devices (not shown). The planetary gear set 510 can also include a plurality of second displacement devices (not shown).

The sun gear (not shown) can be similar to the sun gear 214 (FIG. 2) and the ring gear (not shown) can be similar to the ring gear 220 (FIG. 2). The planet carrier 516 can be similar to the planet carrier 216 (FIG. 2) except the planet carrier 516 can include a plurality of first pins 530 and a plurality of second pins 532. The first pins 530 can be similar to the first pins 230 (FIG. 2) and the second pins 532 can be similar to the second pins 232 (FIG. 2).

Each first planet gear 518 can be similar to the first planet gear 218 (FIG. 2) and can be mounted to a respective one of the first pins 530. Each second planet gear 522 can be similar to the second planet gear 222 (FIG. 2) and can be mounted to a respective one of the second pins 532. The first and second planet gear 518, 522 can be equally spaced about a rotational axis 540 of the planet carrier 516.

In the example provided, the planetary gear set 510 includes three first planet gears 518 and three second planet gears 522, though other quantities can be used. For example, the planetary gear set 510 can have two, three, four, or more total planet gears (e.g. first and second planet gears 518 and 522). The first and second planet gears 518, 522 can be arranged about the axis 540 in an alternating pattern circumferentially about the axis 540, though other configurations can be used. For example, in a planetary gear set (not shown) where an odd number of total planet gears are used (e.g. three total planet gears), the number of first planet gears 518 can be unequal to the number of second planet gears 522 (e.g. two first planet gears 518 and three second planet gears 522).

When the planetary gear set 510 is constructed with an odd number of first planet gears 518 and an equal number of second planet gears 522, each first planet gear 518 can be disposed diametrically opposite of a corresponding one of the second planet gears 522 (e.g. as shown in FIG. 5). When the planetary gear set 510 is configured with an even number of first planet gears 518 and an equal number of second planet gears 522, the first planet gears 518 can be disposed diametrically opposite of each other and the second planet gears 522 can be disposed diametrically opposite of each other.

The first and second displacement devices (not shown) can be similar to the first and second displacement devices 224, 226 (FIGS. 2-4) and can bias the first and second planet gears 518, 522, respectively, in opposite axial directions 550, 554, similar to the first and second displacement devices 224, 226 (FIGS. 2-4). The relative axial biasing or displacement of the first and second planet gears 518, 522 can ensure constant contact of the gear teeth of the first and second planet gears 518, 522 with the sun gear (not shown) and the ring gear (220) to eliminate backlash. The relative axial biasing or displacement of the first and second planet gears 518, 522 can also reduce unequal load sharing among the planet gears 518, 522 to permit greater numbers and smaller sizes of planet gears.

In an alternative construction, the second displacement device (not shown) is not included and the second planet gear 522 can be axially fixed relative to the planet carrier 516. The first displacement device (not shown) can displace the first planet gears 518 axially relative to the second planet gears 522 and into meshing contact with the teeth of the sun gear (not shown). In such a construction, the first displacement device (not shown) can be configured to displace the first planet gear 518 in either axial direction 550, 554 to ensure contact of the gear teeth of the first and second planet gears 518, 522 with the sun gear (not shown) and the ring gear (220) to eliminate backlash. The relative axial biasing or displacement of the first and second planet gears 518, 522 can also reduce unequal load sharing among the planet gears 518, 522 to permit greater numbers and smaller sizes of planet gears.

Figure 6:
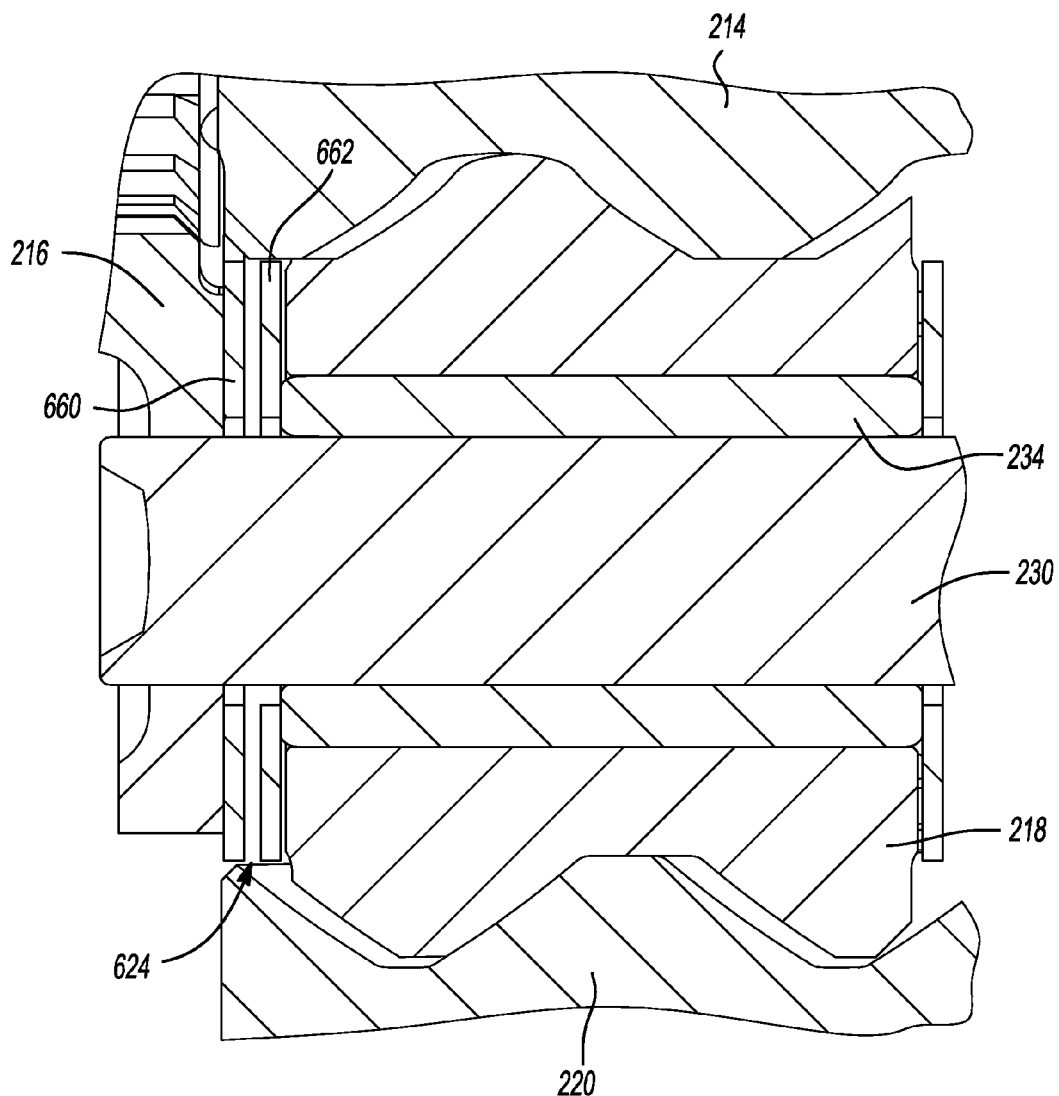
FIG. 6 is a sectional view similar to FIG. 3, illustrating a displacement device of a second construction.

With reference to FIG. 6, a portion of the planetary gear set 210 (FIGS. 2-4) is illustrated with a displacement device 624 of a second construction. The displacement device 624 is illustrated in place of the first displacement device 224 (FIGS. 2 and 3), though it is understood that the displacement device 624 can also be used in place of the second displacement device 226 (FIG. 2). The displacement device 624 can include a first magnet 660 and a second magnet 662. The first and second magnets 660, 662 can be disposed axially between the planet carrier 216 and the first planet gear 218. In the example provided, the first and second magnets 660, 662 are annular shaped and disposed about the first pin 230 though other configurations can be used. In the example provided, the first and second magnets 660, 662 are free to rotate about the first pin 230, though other configurations can be used. The first and second magnets 660, 662 can be configured to repel each other. For example, the similar poles of the first and second magnets 660, 662 can face each other such that their respective magnetic fields (not shown) can urge the first and second magnets 660, 662 apart. Thus the magnetic forces can urge the second magnet axially into the first planet gear 218 to displace the first planet gear 218 axially relative to the planet carrier 216, similar to the spring member 364.

Figure 7:
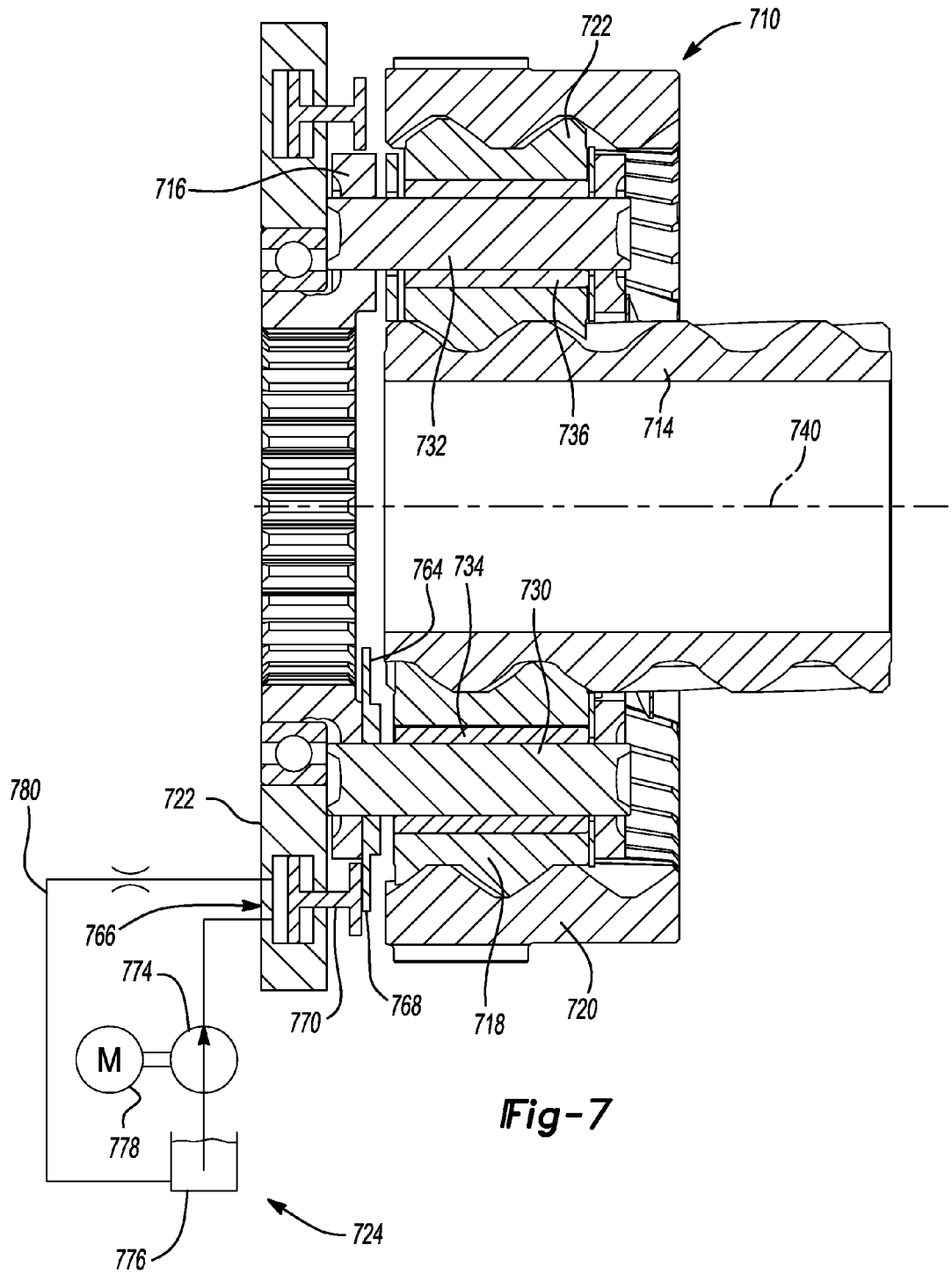
FIG. 7 is a sectional view similar to FIG. 3, illustrating a displacement device of a third construction.

With reference to FIG. 7, a planetary gear set 710 that can be constructed similarly to planetary gear set 210 is illustrated. The planetary gear set 710 can include a sun gear 714, a planet carrier 716, at least one first planet gear 718, a ring gear 720, at least one second planet gear 722, and a displacement device 724 of a third construction.

The sun gear 714 can be similar to the sun gear 214 (FIG. 2) and the ring gear 720 can be similar to the ring gear 220 (FIG. 2). The planet carrier 716 can be similar to the planet carrier 216 (FIG. 2). The first pins 730 can be similar to the first pins 230 (FIG. 2) and the second pins 732 can be similar to the second pins 232 (FIG. 2). The first planet gears 718 can be similar to the first planet gears 218 (FIG. 2) and the second planet gears 722 can be similar to the second planet gears 222 (FIG. 2).

The displacement device 724 can be used in place of the first displacement device 224 (FIGS. 2 and 3). The displacement device 724 can include at least one displacement plate 764, and a hydraulic actuator 766. In the example provided, the displacement plates 764 can be disposed about the first pins 230 and can be free to rotate and slide axially relative to the first pins 230. The displacement plates 764 can be disposed axially between the planet carrier 716 and the first planet gears 718. In the example provided, a portion 768 of the displacement plate 764 can extend radially outward of the planet carrier 216.

The hydraulic actuator 766 can be configured to move the displacement plates 764 axially to axially displace the first planet gears 718. In the example provided, the hydraulic actuator 766 can include a piston 770, a cylinder 772, and a pump 774. In the example provided, the piston 770 and cylinder 772 can be annular in shape and disposed about the axis 740. The piston 770 can be slidably received in the cylinder 772. The pump 774 can be driven by a motor 778 (e.g. an electric motor) and can be fluidly coupled to a reservoir 776. The motor 778 can drive the pump 774 to pump fluid (e.g. hydraulic fluid) from the reservoir 776 to the cylinder 772 to move the piston 770 within the cylinder 772. The piston 770 can extend from the cylinder 772 and can engage the portion 768 of the displacement plate 764 to move the displacement plate 764 axially. A bleed conduit 780 can fluidly couple the cylinder 772 to the reservoir 776 to permit fluid to bleed from the cylinder 772 back to the reservoir 776.

Figure 8:
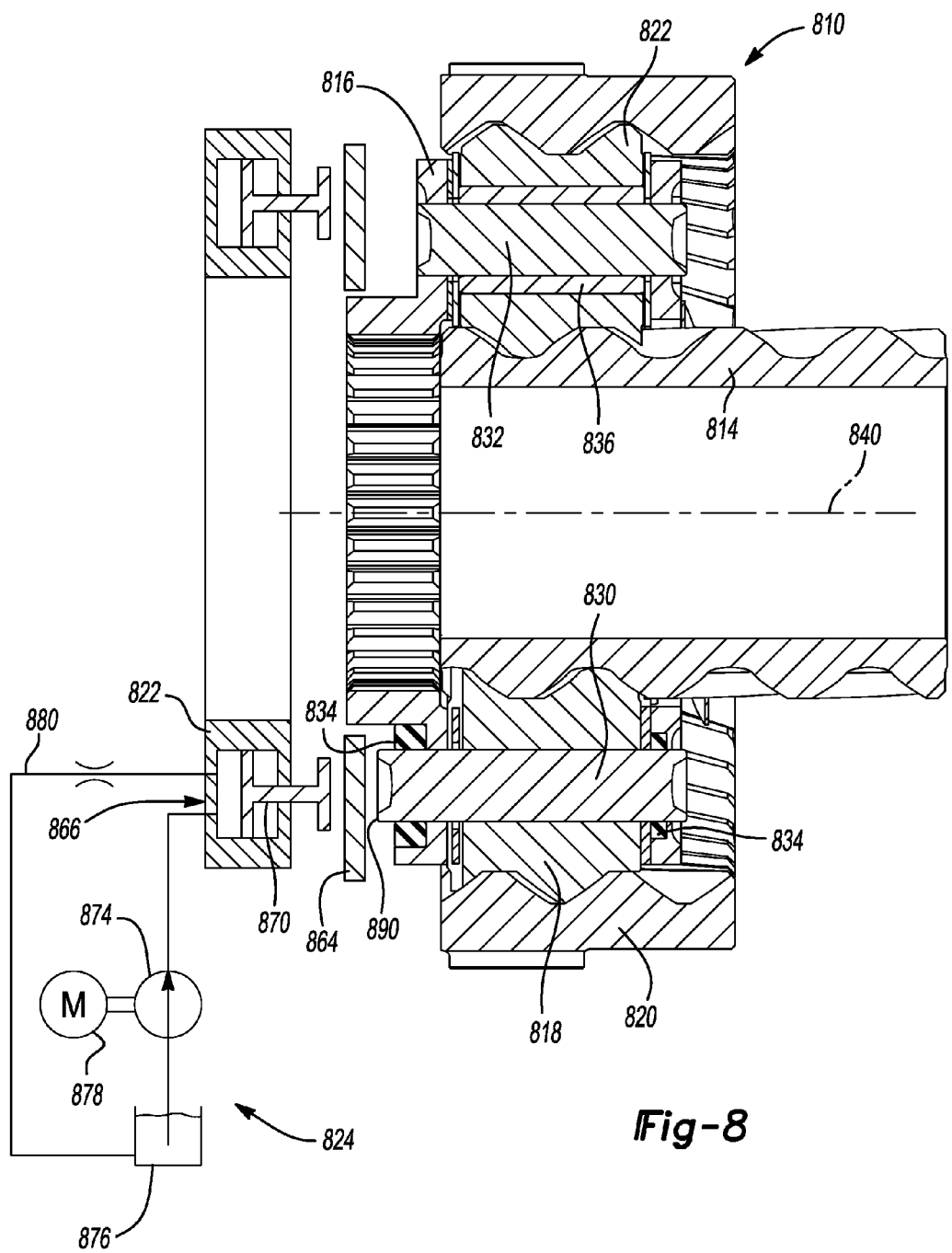
FIG. 8 is a sectional view similar to FIG. 3, illustrating a displacement device of a fourth construction.

With reference to FIG. 8, a planetary gear set 810 that can be constructed similarly to planetary gear set 210 is illustrated. The planetary gear set 810 can include a sun gear 814, a planet carrier 816, at least one first planet gear 818, a ring gear 820, at least one second planet gear 822, and a displacement device 824 of a fourth construction.

The sun gear 814 can be similar to the sun gear 214 (FIG. 2) and the ring gear 820 can be similar to the ring gear 220 (FIG. 2). The planet carrier 816 can be similar to the planet carrier 216 (FIG. 2). The first pins 830 can be similar to the first pins 230 (FIG. 2) and the second pins 832 can be similar to the second pins 232 (FIG. 2). The first planet gears 718 can be similar to the first planet gears 218 (FIG. 2) except as described below, and the second planet gears 722 can be similar to the second planet gears 222 (FIG. 2). In the example provided, the first pins 830 are supported for rotation relative to the planet carrier 816 by a set of bearings or journals 834 disposed about the first pins 830 and between the first pins 830 and the planet carrier 816. The first pins 830 can have an end 890 that can extend axially outward from the planet carrier. In this example, the first planet gears 818 can be fixedly coupled to the first pins 830 for common rotation relative to the planet carrier 816.

The displacement device 824 can be used in place of the first displacement device 224 (FIGS. 2 and 3). The displacement device 824 can include a displacement plate 864, and a hydraulic actuator 866. In the example provided, the displacement plate 864 can be disposed about a rotational axis 840 of the planet carrier 816 and can be free to rotate and slide axially relative to the planet carrier 816.

The hydraulic actuator 866 can be configured to move the displacement plate 864 axially to axially displace the first pins 830 and the first planet gears 818. In the example provided, the hydraulic actuator 866 can include a piston 870, a cylinder 872, and a pump 874. In the example provided, the piston 870 and cylinder 872 can be annular in shape and disposed about the axis 840. The piston 870 can be slidably received in the cylinder 872. The displacement plate 864 can be disposed axially between piston 870 and the first pins 830. The pump 874 can be driven by a motor 878 (e.g. an electric motor) and can be fluidly coupled to a reservoir 876. The motor 878 can drive the pump 874 to pump fluid (e.g. hydraulic fluid) from the reservoir 876 to the cylinder 872 to move the piston 870 within the cylinder 872. The piston 870 can extend from the cylinder 872 and can engage the displacement plate 864 to move the displacement plate 864 axially. A bleed conduit 880 can fluidly couple the cylinder 872 to the reservoir 876 to permit fluid to bleed from the cylinder 872 back to the reservoir 876.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A transmission comprising:
   a planetary gear set including:
      a sun gear disposed about a first axis;
      a ring gear disposed about the first axis;
      a planet carrier disposed about the first axis;
      a first planet gear meshingly engaged with the sun gear and the ring gear, and coupled to the planet carrier for rotation relative to the planet carrier about a second axis, the first planet gear being axially slidable relative to the planet carrier; and
      a second planet gear meshingly engaged with the sun gear and the ring gear, and coupled to the planet carrier for rotation relative to the planet carrier about a third axis; and
   a first displacement device configured to displace the first planet gear axially relative to the second planet gear.

2. The transmission of claim 1, wherein the first displacement device includes a first magnet and a second magnet, the first magnet being coupled to the first planet gear and configured to cooperate with the second magnet to move the first planet gear axially relative to the second planet gear.

3. The transmission of claim 1, wherein the first displacement device includes a hydraulic actuator configured to move the first planet gear relative to the second planet gear.

4. The transmission of claim 1, wherein the first displacement device includes a spring configured to bias the first planet gear axially relative to the second planet gear.

5. The transmission of claim 1, further comprising a second displacement device configured to displace the second planet gear axially relative to the first planet gear, the first and second displacement devices being configured to displace the first and second planet gears in opposite axial directions.

6. The transmission of claim 5, further comprising a plurality of the first planet gears and a plurality of the second planet gears, wherein the first and second planet gears are evenly spaced circumferentially about the first axis.

7. The transmission of claim 1, wherein the second planet gear is axially fixed relative to the sun gear.

8. The transmission of claim 1, further comprising a plurality of first the planet gears and a plurality of the second planet gears.

9. The transmission of claim 1, wherein the ring gear is rotationally fixed to a housing of the transmission.

10. A transmission comprising:
    a housing;
    a planetary gear set disposed about a first axis and including:
       a sun gear rotatable about the first axis;
       a ring gear non-rotatably coupled to the housing;
       a planet carrier rotatable about the first axis;
       a first planet gear meshingly engaged with the sun gear and the ring gear, and coupled to the planet carrier for common rotation about the first axis, the first planet gear being rotatable relative to the planet carrier about a second axis and being axially slidable along the second axis relative to the planet carrier; and
       a second planet gear meshingly engaged with the sun gear and the ring gear, and coupled to the planet carrier for common rotation about the first axis, the second planet gear being rotatable relative to the planet carrier about a third axis; and
    a first displacement device configured to displace the first planet gear axially relative to the second planet gear.

11. The transmission of claim 10, wherein the first displacement device includes a first magnet and a second magnet, the first magnet being coupled to the first planet gear and configured to cooperate with the second magnet to move the first planet gear axially relative to the second planet gear.

12. The transmission of claim 10, wherein the first displacement device includes a hydraulic actuator configured to move the first planet gear relative to the second planet gear.

13. The transmission of claim 10, wherein the first displacement device includes a spring configured to bias the first planet gear axially relative to the second planet gear.

14. The transmission of claim 10, further comprising a second displacement device configured to displace the second planet gear axially relative to the first planet gear, the first and second displacement devices being configured to displace the first and second planet gears in opposite axial directions.

15. The transmission of claim 14, further comprising a plurality of the first planet gears and a plurality of the second planet gears, wherein the first and second planet gears are evenly spaced about the first axis.

16. The transmission of claim 10, wherein the second planet gear is axially fixed relative to the sun gear.

17. The transmission of claim 10, further comprising a plurality of the first planet gears and a plurality of the second planet gears evenly spaced about the first axis.

18. A transmission comprising:
    a planetary gear set disposed about a first axis and including:
       a sun gear rotatable about the first axis;
       a ring gear non-rotatably coupled to the housing;
       a planet carrier rotatable about the first axis;
       a plurality of first planet gears meshingly engaged with the sun gear and the ring gear, and coupled to the planet carrier for common rotation about the first axis, each of the first planet gears being rotatable relative to the planet carrier and axially slidable along relative to the planet carrier; and
       a plurality of second planet gears meshingly engaged with the sun gear and the ring gear, and coupled to the planet carrier for common rotation about the first axis, each of the second planet gears being rotatable relative to the planet carrier, wherein the first and second planet gears are equally spaced circumferentially about the first axis; and a first biasing device configured to bias the first planet gears in a first axial direction.

19. The transmission of claim 18, further comprising a second biasing device configured to bias the second planet gears in a second axial direction that is opposite the first axial direction.

20. The transmission of claim 18, wherein the second planet gears are axially fixed relative to the planet carrier.

\* \* \* \* \*